Jan. 24, 1961  G. H. WAGMAN ET AL  2,968,991
APPARATUS FOR RECORDING, PLAYBACK AND ERASE OF SOUND
ON MAGNETICALLY PREPARED MOVIE FILM
Filed Nov. 23, 1955  2 Sheets-Sheet 1
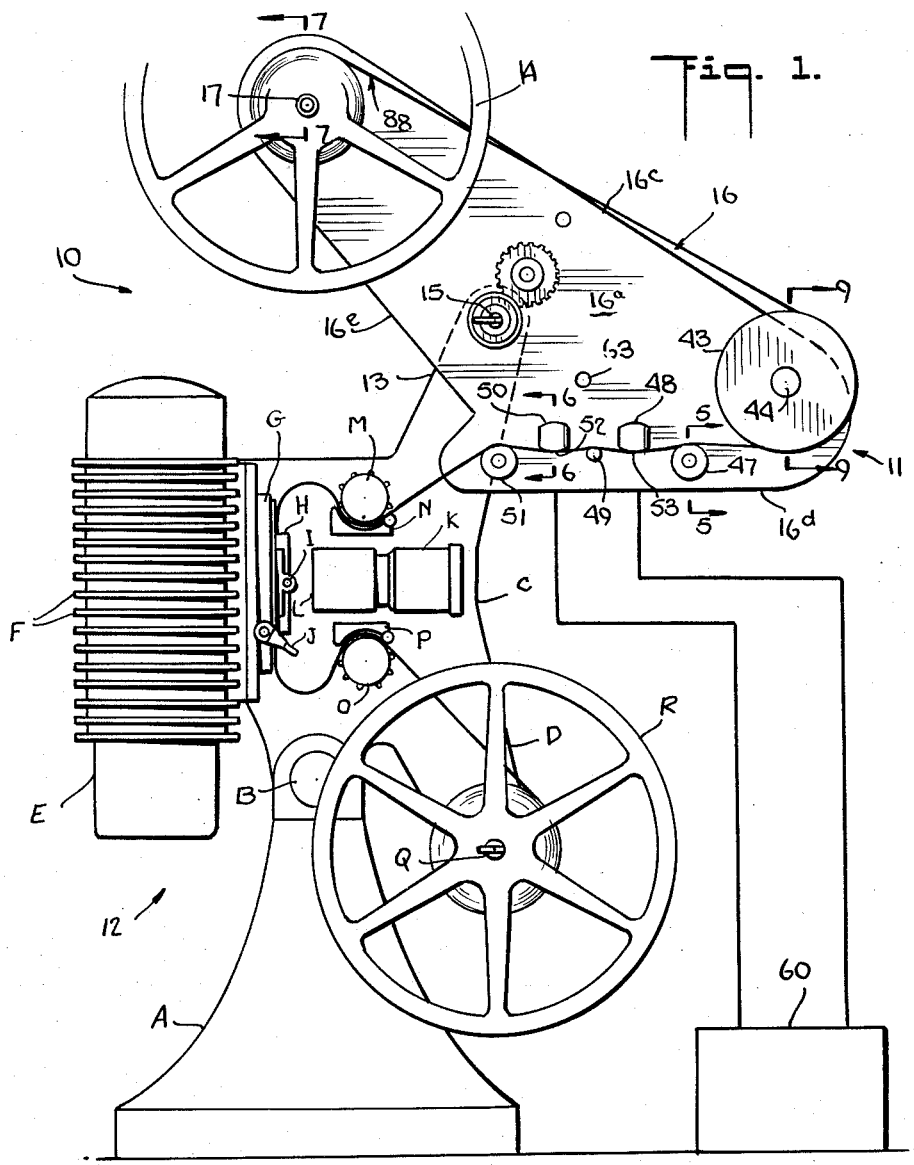
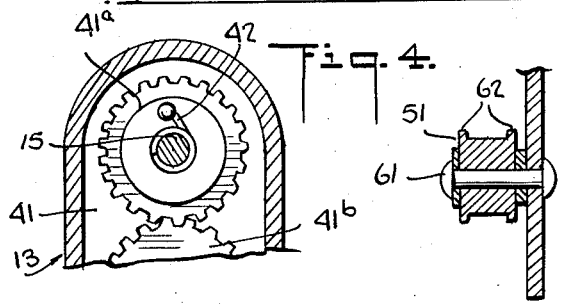
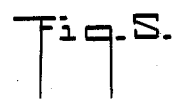
INVENTOR.
GERALD H. WAGMAN
ARNOLD B. BASKIN
BY
J. B. Felshin
ATTORNEY Jan. 24, 1961 G. H. WAGMAN ET AL 2,968,991
APPARATUS FOR RECORDING, PLAYBACK AND ERASE OF SOUND
ON MAGNETICALLY PREPARED MOVIE FILM
Filed Nov. 23, 1955 2 Sheets-Sheet 2
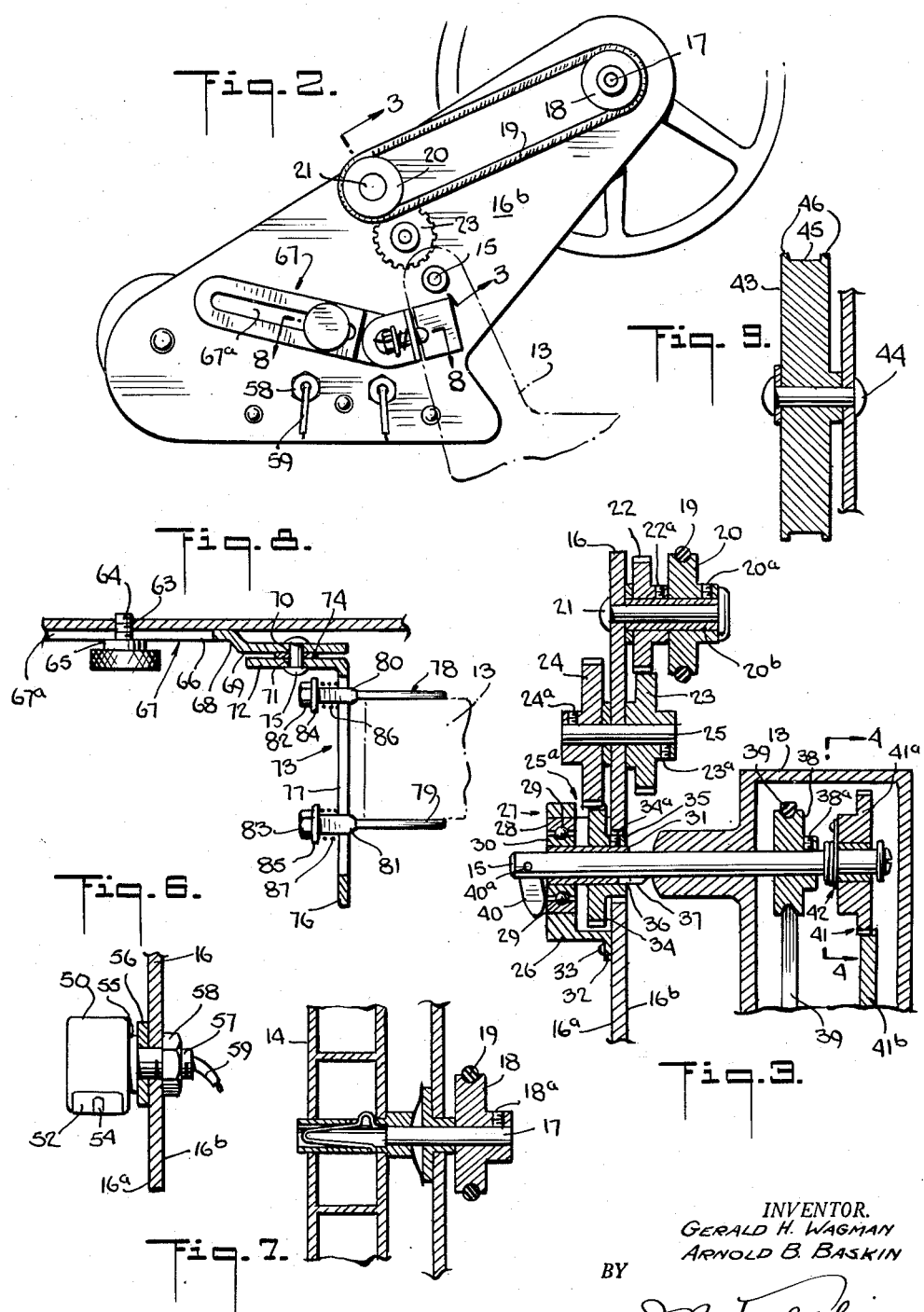
INVENTOR.
GERALD H. WAGMAN
ARNOLD B. BASKIN
BY
ATTORNEY United States Patent Office 2,968,991
Patented Jan. 24, 1961

2,968,991

APPARATUS FOR RECORDING, PLAYBACK AND ERASE OF SOUND ON MAGNETICALLY PREPARED MOVIE FILM

Gerald H. Wagman, 62 Farm Road Circle, East Brunswick, N.J., and Arnold B. Baskin, 1706 Davidson Ave., New York, N.Y.

Filed Nov. 23, 1955, Ser. No. 548,583

23 Claims. (Cl. 88—16.2)

The present invention relates to an apparatus for recording, playback and erase of sound on magnetically prepared movie film, which device may be applied to various silent types of motion picture projectors.

This application discloses features of our application Serial Number 330,746, filed January 12, 1953, for Sound Recording and Reproducing Equipment Adapter which was co-pending with this application and has since been abandoned. This application is a continuation in part of the earlier application.

Until recently sound has been applied to movie film only by the photoelectric method. The advent of tape recording mechanism has made possible the application of a coating of metallic dust of a small width running the length of a film. This strip may then be recorded upon by a magnetizing head of which there are many standard makes.

This new method of producing sound movies has been used successfully by professionals with special equipment.

It has been realized that this method of recording on film can be used by the many small home movie projectors at a cost and facility of application that was formerly prohibited by the expense and the complications of the photoelectric process.

To this end, several adaptors have been devised. The chief limitations of previous adaptors were their cost, their inability to be fitted to a wide variety of existing projectors, and uneven recording caused by tensions of the original projectors that were made for film projection and not for recording.

It is the object of this invention to provide an adaptor that may be fitted to all standard 8 mm. and 16 mm. home movie projectors, that will record, play back and erase upon a magnetically treated film.

It is also the object of this invention to provide a novel way of attaching a sound recording adaptor to a movie projector directly to the upper reel shaft.

It is also the object of this invention to provide a secondary clamping means to further secure an adaptor to a movie projector.

A further object of this invention is to provide a tape recording adapter for a movie projector that applies a uniform tension, governed by the adaptor, on the film regardless of which projector it is fitted to.

It is a further object of this invention to provide a recording adapter for a movie projector that is simple and easy for the amateur to use, produce good results and be inexpensive to manufacture and market.

Other objects and advantages will in part be obvious and in part pointed out in connection with the accompanying drawings in which:

Fig. 1 is a side elevational view of a conventional motion picture film projector having the device of the present invention attached thereto;

Fig. 2 is a rear elevational view of an adaptor in accordance with the invention;

Fig. 3 is a sectional view taken on line 3—3 of Fig. 2;

Fig. 4 is a sectional view taken on line 4—4 of Fig. 3;

Fig. 5 is a sectional view taken on line 5—5 of Fig. 1;

Fig. 6 is a part sectional view taken on line 6—6 of Fig. 1;

Fig. 7 is a sectional view taken on line 7—7 of Fig. 1;

Fig. 8 is a top sectional view of secondary means for securing the device to a projector; and Fig. 9 is a sectional view taken on line 9—9 of Fig. 1.

Referring now to the drawing, in Fig. 1, 10 designates a device comprising a projector 12 fitted with an adaptor 11 embodying the invention. The projector 12 is of usual construction and has a base A, a swivel joint B at the top of the base A to which is attached the projector body C. Extending downwardly and forwardly of the projector body is the lower arm D, and extending upwardly and forwardly is the arm 13 supporting a rotary reel shaft 15. At the rear of the projector body C is a lamp housing E containing a lamp and having cooling fins F. Mounted directly in front of the lamp housing is an apertured plate G containing a dust plate I and separable from the apertured plate by means of a lever J. The two plates G and H are formed with apertures through which light from the lamp housing may pass to a lens K fastened by a lens mount L directly in front of the pressure point for film supported by an upper sprocket M is mounted above the lens. An upper film guide N. A lower sprocket O and film guide P are mounted below the lens. The sprockets are operated by an electric motor not illustrated. The lower arm D has a reel shaft Q protruding therefrom and a take-up reel R thereon.

The adaptor 11 is attached to the projector 12 entirely on the upper arm 13 of the projector 12. The supply reel 14 which is usually placed on the reel shaft 15 is replaced by roughly triangular plate 16 of the adaptor 11, having a front face 16a and a rear face 16b, and means to mount said plate on said reel shaft to be hereinafter described. Plate 16 has a top downwardly and forwardly inclined edge 16c, a bottom horizontal edge 16d, and a rear upwardly and rearwardly inclined edge 16e. At the upper end of the plate 16 is a rotatably mounted reel shaft 17 to which the supply reel 14 is attached. On the other side of the plate 16, which may be seen in Fig. 2, a pulley 18 is attached to the upper reel shaft 17 and rotates therewith. A coiled spring type of belt 19 runs from the pulley 18 to another pulley 20 rotatably mounted on plate 16 and placed about half-way down the leading edge 16c of said plate. The pulley 20 is connected directly to the reel shaft 15 by a system of gears best shown in Fig. 3.

The pulley 20 is mounted on the plate 16 by means of a sleeve 20b rotatably mounted on a fixed rivet, bolt, or pin 21. Set screws 20a attaches pulley 20 to the sleeve 20b on said plate. Located between the plate 16 and the lower pulley 20 is the gear 22 secured to said sleeve 20b by the lock screw 22a. Adjacent this assembly and located on a line between the rivet 21 and the reel shaft 15 are a pair of gears comprising one gear 23 disposed on the face 16b of the plate 16, and a second gear 24 on the rear face 16a of the plate 16, with a rivet, pin or bolt 25 passing through the plate and holding the gear 23 on one side, and the gear 24 on the other, by means of the lock screws 23a and 24a, respectively, so that the gears rotate together. Gear 23 meshes with gear 22. Gear 24 protrudes into a cutaway portion 25a of housing 26 fixed to face 16a of plate 16. The housing 26 contains and secures a ball bearing 27 having an outer end 28 in which are a number of balls at 29 that connect in rotatable connection to an inner ring 30. A sleeve 31 is pressed into the ring 30 and held fast by friction. The sleeve 31 rotates freely within the housing 26. The housing is secured to the base plate 16 by means of feet 32 held by screws 33. A gear 34 is mounted coaxially on the sleeve 31 and secured thereto by lock screw 34a. The gear 34 meshes with gear 24 through the cutaway 25. The anterior end of the sleeve 31 extends through a hole 35 in the plate 16 to a plane flush with the surface 16b, and is formed with a longitudinal notch 36 in its inner surface.

All home movie projectors are constructed with a leading upper part, such as arm 13, a reel shaft 15 protruding therefrom, a reel retaining lug 37 thereon, means within the arm 13 to drive the reel shaft 15 for rewinding, such as the pulley 38 secured to the reel shaft 15 by means of lock screw 38a and driven by the belt 39 connected to the motor for rewind operation. Many projectors may also have a reel lock clip 40 pivotally mounted on shaft 15 by means of a transverse pin 40a carried by said shaft, and also forward and reverse gearing mechanism 41 comprising a gear 41a rotatable on shaft 15 and connected thereto. Gear 41a meshes with gear 41b connected to the motor.

When the projector is operating forwardly (during projection of the film) gear 41a rotates in a clockwise direction, looking at Fig. 4, and has no effect on shaft 15. During "reverse" gear 41a rotates in a counterclockwise direction (Fig. 4) and hence rotates shaft 15 in a counterclockwise direction through the coil clutch 42. Thus, it may be seen that the action of a projector normally controlling the supply reel 14 directly by means of the reel shaft 15 is now communicated from the reel shaft 15 to the sleeve 31 and thereby to the gear 34 to the gear 24 which connected with the gear 23, thence to gear 22 and to the pulley 20 which by means of the spring belt 19 drives the pulley 18 which is secured by lock screw 18a to the reel shaft 17 which now holds the supply reel 14. In this manner, a coil spring belt has been interposed between the projector reel shaft and the supply reel or film.

The great advantage of this arrangement is as follows:

The drag on the supply reel by a projector varies with different projectors making the tension on the film different with different projectors. The film gives out spasmodically as the drag system (usually a slip clutch at the lower end of the rubber belt 39) catches and is again pulled loose by the pull of the upper sprocket M. A coil spring belt has the property of stretching and contracting to meet and even out such uneven tensions. It will begin to slip on a pulley smoothly giving way easily when necessary. The stretching belt will give even tension or drag for all projectors because the tension comes not from the arm of the projector but from the belt of the adaptor.

When the usual projector is set to operate in reverse or rewind, the pull of the upper reel shaft 15 (which is connected directly to the motor for rewind) is too severe and would damage a film being wound over a recording head. The spring belt introduced by the present invention, because of its ability to stretch and slip evenly, and take up slack, assures a uniform degree of tension on the film at all times so that the film does not rub excessively or catch on the recording head, yet is taut enough to make contact at all times. This will become clearer by the following description of the recording mechanism.

Returning to Fig. 1, a large film guide wheel 43 is rotatably mounted at the lower leading portion of the plate 16 so as to rotate freely about a bolt or rivet 44. The periphery of the wheel is formed with a groove 45 having side walls 46, best seen in Fig. 9. Arranged in a row along the lower portion of the plate 16, adjacent the bottom edge 16d, are a small film guide wheel 47, a magnetic erase head 48, a film guide post 49, a magnetic record play back head 50, and a small film guide wheel 51. The two guide wheels 51 and 47 and post 49 are disposed slightly higher than the lower faces of the magnetic heads 48 and 50 in order that the tape, under tension, will be pulled across the lower faces 52 and 53 of the magnetic heads. The magnetic heads are attached as in Fig. 6, wherein a magnetic recording head 50 of a standard type is shown having a plastic face 52 set with a metal recording bar 54, a neck portion 55, a washer 56 between said neck portion and surface 16a of plate 16, a bolt 57 passing through plate 16, and a nut 58 disposed to secure said bolt. The wire 59 connects the head to an amplifier 60 shown in Fig. 1. The small guide wheels are attached to the plate 16 by means of the bolts 61, as shown in Fig. 5. The guide wheel has raised ribs 62.

At a point above the recording heads and forward of the housing 26 there is a threaded hole 63 receiving from side 16b a headed screw 64 shown in Figs. 2 and 8. The headed screw 64 provided with a washer 65 fastens plate 16 to a slotted portion 66 of bracket 67. The bracket is slidable on the headed screw which goes through the slot 67a. The bracket 67 normally runs from the screw position at the hole 63—forward of the housing 26 which with the sleeve 31 fits on the reel shaft 15—to a point adjacent the upper projector arm 13, at which point the bracket has an offset portion 68 extending away from the plate 16 and a portion 69 extending from portion 68 parallel with the plate 16 and raised therefrom. The portion 69 of bracket 67 is formed with a hole 70 corresponding to a hole 71 in a leg 72 of L shaped bracket 73. The leg 72 and portion 69 are separated by a washer 74. A rivet 75 passes through both brackets and the washer 74. At a right angle to leg 72, a leg 76 of bracket 73 extends. Leg 76 is formed with a slot 77 and has two clamp plates 78 and 79 mounted thereon, by means of square bolts 80 and 81 attached to the plates and passing through said slot 77 to secure nuts 82 and 83. Contacting the nuts 82 and 83 are washers 84 and 85 to hold springs 86 and 87 respectively, so that the plates 78 and 79 may be held firmly but not rigidly. Plates 78, 79 may be slidably moved toward each other or moved to grip the arm 13 between them, and will accommodate arms of various sizes.

Thus it may be seen that the device of the present invention is attached to a projector in two places. First, the sleeve 31 is slipped onto the reel shaft 15 with the slot 36 fitted onto lug 37. If the reel shaft is provided with a reel clip 40 it should be used. The adapter is attached to the projector. Thus, the sleeve 31 serves as a power take off and as an attaching means. Secondly, the bracket and clamp assembly 64—87 is clamped to the upper projector arm 13 as previously described. The adaptor is now firmly attached to the projector in two places.

Plates 78, 79 may be rubber faced if desired.

To record on a film that has a suitable sound track thereon, the procedure is as follows:

The supply reel 14 with the film 88 is mounted on the uppermost reel shaft 17. The film 88 is threaded to go forward around the large guide wheel 43, then rearwardly over the first small guide wheel 47, under magnetic head 48, over guide pin 49, under magnetic head 50, over small guide wheel 51, between sprocket M and film clamp N, arch up and go downwardly between the plate G and the plate H, loop up to go between sprocket O and film clamp P, and from there wind on to the take up reel R on the lower reel shaft Q. The sound track should face up at the points where the film contacts the head faces 52 and 53. The sound force, a microphone or phonograph, etc., is fed into the amplifier 60 which should be set to record, and the projector started. To reverse the direction of the film, the projector is merely switched to "reverse" and the tape recording mechanism will respond. Any sudden pull on the film caused by putting the projector into reverse or rewind operation, will be absorbed by the coil spring belt 19.

When the film has completely run from the upper reel 14 to the lower reel R, it is desirable to rewind the film for re-showing. Rewinding is accomplished by threading the film up, around the large guide wheel 43 to the supply reel 14. The projector control is switched to rewind position and operated as normal. It is not necessary to remove the adapter in order to reverse or rewind the film.

It may be seen from the foregoing that the several objects of this invention have been accomplished. The scope of the invention will be indicated in the following claims.

We claim:

1. A sound recording and play back adaptor for a motion picture projector having an upstanding feed arm, a feed reel shaft on said arm, means on said projector to rotate said feed reel shaft, and a drive sprocket wheel for moving film to its projection position, said adaptor comprising a plate, means rotatable on the plate for mounting a film supply reel thereon for rotation, a sleeve mounted on said plate for rotation and adapted to receive and be coupled with said feed reel shaft, to attach said adaptor to the upstanding arm of the projector for movement about the axis of said sleeve, means to connect said sleeve to said film supply reel mounting means for driving a supply reel mounted thereon upon rotating said sleeve by means of said feed snaft during rewind, and to act as a drag during projection, means on said plate to record sound on a sound track on film coming off said supply reel, and means for guiding film from said supply reel past said recording means so as to make contact therewith as the film passes to the drive sprocket on the projector.

2. The combination of claim 1, said connect means including a pair of pulleys and a belt interconnecting said pulleys.

3. The combination of claim 2, said belt comprising a coil spring wire.

4. The combination of claim 1, and means to connect the plate on the upstanding feed arm of the projector in adjusted angular position about the axis of said sleeve, said last means comprising a bracket arm adjustably attached to said plate, a second bracket arm extending at right angles to the plate and pivotally connected to the first bracket arm, and a pair of clamp members individually slidably mounted on said second bracket arm for engaging opposite sides of said arm of said projector.

5. The combination of claim 4 in combination with spring means on said clamp members for retaining said clamp members in any position to which they are moved.

6. The combination of claim 3, and means to mount the plate on the upstanding arm of said projector in desired angular position comprising a bracket adjustably mounted on said plate and having an arm extending at right angles to the plate, and means adjustable relative to said bracket arm for engaging said arm of said projector.

7. A sound recording and play back adaptor for a motion picture projector, said adaptor comprising a plate, a notched sleeve rotatably mounted thereon and adapted to be drivingly coupled to a projector reel shaft of a moving picture projector, a gear on said sleeve, a shaft journalled on said plate, a gear on said last shaft meshing with the first gear, another gear on said shaft, a second shaft rotatably mounted on said plate, a gear on the second shaft meshing with said other gear on the first plate mounted shaft, a third shaft rotatably mounted on said plate and extending through the plate, a pulley on said second plate mounted shaft, a pulley on said third plate mounted shaft, means on said third plate mounted shaft for mounting a feed film reel thereon, a belt interconnecting said pulleys, a wheel rotatably mounted on said plate whereby film from the reel on said third shaft may pass over said wheel, magnetic record and erase means on said plate, and means on said plate to guide film passing from said wheel into contact with said record and erase head whereby rotation of said projector reel shaft during rewind will cause rotation of said feed film reel, and whereby said feed film reel, gears, pulleys and belt will act as a drag on the film during projection.

8. The combination of claim 7, in combination with a bracket having a pair of arms at right angles to one another, means for attaching one of said arms to said plate in various adjusted positions relative to said arm, and a pair of members adjustably mounted on said other arm of said bracket for clamping said plate to a portion of a projector.

9. A sound recording and play back adaptor for a motion picture projector, said adaptor comprising a plate, a sleeve rotatably mounted on said plate and adapted to receive and to be coupled coaxially with the feed reel shaft driven in one direction during rewind, by clutch means of a moving picture projector, a pulley mounted for rotation on said plate, means rotatable with the pulley to support a film supply reel, a second pulley mounted for rotation on said plate, a belt interconnecting said pulleys, gearing interconnecting the second pulley with said sleeve, a wheel rotatably mounted on said plate and adapted to receive film coming off a film supply reel on said reel supporting means, magnetic erase and record heads mounted on said plate, and means on said plate to press film passing from said wheel against said heads, and means to mount said plate on a projector.

10. The combination of claim 9, said last means being adjustable in a direction perpendicular to the plate, in directions lengthwise and angularly of the plate.

11. A sound recording and play back adaptor for a motion picture projector, said adaptor comprising a plate, means rotatably mounted thereon for coupling and to be coupled to the feed reel shaft of a moving picture projector driven in one direction during rewind, means on said plate to support a film supply reel, drive means interconnecting said coupling means and said supply reel supporting means, and including a belt and adjustable means to mount said plate on a projector.

12. The combination of claim 11, said belt comprising a coil of spring wire.

13. The combination of claim 12, said adjustable means comprising a slotted arm, a member extending through the slot in the slotted arm for clamping said slotted arm in various angularly and longitudinally adjusted positions to said plate, an arm pivoted to the first arm about an axis at right angles to the plate, said second arm having a portion extending at right angles to the plate, and a pair of clamp members adjustable longitudinally on the second arm for clampingly engaging a portion of a moving picture projector.

14. A sound recording and play back adaptor for a motion picture projector, said adaptor comprising a plate having a front face and a rear face, a supply reel shaft mounted through the plate and extending from said rear face, a pulley wheel mounted on said rear face extension of said reel shaft for rotation therewith, a pin mounted on the rear face of said plate, a second pulley wheel and a gear wheel mounted on said pin for rotation together, a coil spring belt connecting the first said pulley wheel and the second said pulley wheel, a pin through said plate, a second gear mounted on the rear face extension of said pin, a third gear mounted on the front face extension of said pin, said second gear meshing with said first gear, a housing formed with an opening mounted on the front face of said plate, a bearing mounted within said housing, a sleeve rotatably mounted in said bearing and extending through said plate, said sleeve formed with a slot, a fourth gear wheel coaxially mounted on said sleeve adjacent said opening in said housing, said third gear meshing with said fourth gear through said opening in said housing, said plate being formed with a threaded hole, a slotted bracket adjacent said hole on said rear face of said plate, a headed screw passing through said slotted bracket, engaging said threaded hole and securing said bracket, a second bracket rotatably mounted on said first bracket, said second bracket being formed with a slot, two adjustable clamp plates mounted in said slot in said second bracket, a film guide wheel mounted on the front face of said plate and in series, a small film guide wheel, a magnetic recording head, a guide post, a second magnetic recording head, and a second film guide.

15. A sound recording and play back adaptor for a motion picture projector, said adaptor comprising in combination, a plate, means rotatable on the plate for mounting a film supply reel thereon, means for mounting said plate on a feed reel shaft of a moving picture projector, drive means including a coil spring belt connecting said feed reel shaft to said supply reel mounting means, means to secure said plate to an arm of the projector, means on the plate to record sound on said film, and means on the plate for guiding said film to the drive sprocket on said projector, whereby said belt will rotate said reel mounting means during rewind, and whereby said belt will act as a drag on film from said film supply reel in engagement with the sound record means during projection.

16. In combination, a support, means rotatably mounted on said support to couple to the rotary feed shaft on the feed arm of a motion picture projector, said arm having means to rotate the feed shaft in one direction only on rewind, means rotatably mounted on said support to mount a film supply reel on said support for rotation with said reel mount means, sound record means on said support for recording sound on a magnetic track on film from the feed reel, means mounted in said support to guide film from the supply reel into engagement with the sound record means, and means connecting the supply reel mounting means with the coupling means, to rotate said reel mounting means during rewind, and whereby said connecting means acts as a drag on film from a feed film reel in engagement with the sound record means, during projection.

17. The combination of claim 16, in combination with adjustable means on said support for attachment to said feed arm in various adjusted angular positions.

18. In combination with the feed shaft on the feed arm of a motion picture projector, clutch means to rotate said shaft in one direction only during reverse, and to declutch said shaft during projection, slip means to drive said shaft in said direction during rewind, a support, means to mount the support for movement axially of said feed shaft, means on said support to mount a feed supply reel on said support for rotation, and means connecting said feed shaft and supply film reel mount means, to rotate said mount means only during rewind or reverse, and whereby said connect means will act as a drag for film from the feed reel during projection, means on the support to record sound on a magnetic track on film from the feed reel and means on the support to keep the film in engagement with the sound record means.

19. The combination of claim 18 in combination with adjustable means to attach said support to the feed arm in desired angular position of said support relative to said arm.

20. A sound recording and play back adaptor for a motion picture projector, said adaptor comprising a support, means rotatably mounted on said support and adapted to be coupled to the feed shaft of a motion picture projector for rotation therewith, means rotatably mounted on said support for rotation about an axis spaced from the first rotatably mounted means, and having means for mounting a supply film reel thereon for rotation therewith, drive means to connect said first and second rotatably mounted means, to rotate the second rotatably mounted means during rewind, sound record means on said support to record sound on a magnetic track on film from said supply reel, and means on said support to maintain such film in contact with the sound record means, said drive means acting as a drag on the film during projection.

21. The combination of claim 20, said drive means including a slip friction means.

22. The combination of claim 20, in combination with a clamping means mounted on said support for clamping the support to a feed arm of a projector said clamp means having feed arm grip means adjustable radially, and angularly relative to the axis of the first rotatably mounted means.

23. The combination of claim 22, and said grip means being adjustable toward and away from said support.

References Cited in the file of this patent
UNITED STATES PATENTS

| | | |
|---|---|---|
| 1,336,775 | Darby | Apr. 13, 1920 |
| 1,877,731 | Kuchenmeister | Sept. 13, 1932 |
| 1,912,153 | Monson et al. | May 30, 1933 |
| 2,064,049 | Wurm et al. | Dec. 15, 1936 |
| 2,064,050 | Wurm et al. | Dec. 15, 1936 |
| 2,379,489 | Krenzer | July 3, 1945 |
| 2,532,761 | De Blasio | Dec. 5, 1950 |
| 2,694,107 | Camras | Nov. 9, 1954 |
| 2,773,416 | Kleinerman | Dec. 11, 1956 |

OTHER REFERENCES

"Sound Adapter for Silent Projectors," photography, April 1954, page 110.